US00RE34892E

United States Patent [19]

Dunwoodie

[11] E Patent Number: Re. 34,892

[45] Reissued Date of Patent: Apr. 4, 1995

[54] CONTAINER AND CONSTRUCTION THEREFOR

[75] Inventor: Edward H. Dunwoodie, Long Beach, Calif.

[73] Assignee: Century Aero Products International, Inc., Compton, Calif.

[21] Appl. No.: 622,668

[22] Filed: Dec. 5, 1990

Related U.S. Patent Documents

Reissue of:

[64] Patent No.: 4,795,047
Issued: Jan. 3, 1989
Appl. No.: 902,668
Filed: Sep. 2, 1986

U.S. Applications:

[63] Continuation-in-part of Ser. No. 874,387, Jun. 16, 1986, abandoned, which is a continuation-in-part of Ser. No. 813,898, Dec. 27, 1985, abandoned.

[51] Int. Cl.[6] ..... B65D 87/00

[52] U.S. Cl. ..... 220/1.5; 220/668; 220/691

[58] Field of Search ..... 220/1.5, 668, 683, 691, 220/688

[56] References Cited

U.S. PATENT DOCUMENTS

| | | | |
|---|---|---|---|
| 2,283,574 | 5/1942 | Pillsbury | 160/391 |
| 2,572,401 | 10/1951 | Snow | 220/80 X |
| 2,838,592 | 6/1958 | Feketics | 220/80 X |
| 3,323,819 | 6/1967 | Barker | 160/392 X |
| 3,424,331 | 1/1969 | Borden | 220/1.5 |
| 3,589,548 | 6/1971 | Weiss | 220/4 F |
| 3,598,273 | 8/1971 | Rau et al. | 220/1.5 |
| 3,907,148 | 9/1975 | Meller et al. | 220/1.5 |
| 4,046,186 | 9/1977 | Nordstrom | 220/1.5 X |
| 4,212,406 | 7/1980 | Mittelmann | 220/84 X |
| 4,234,035 | 11/1980 | Babbs | 160/392 |
| 4,429,730 | 2/1984 | Elston | 220/1.5 X |
| 4,453,585 | 6/1984 | Ruggeberg, Sr. | 160/354 |
| 4,833,771 | 5/1989 | Dunwoodie | 220/1.5 |
| 4,923,076 | 5/1990 | Weiss et al. | 220/1.5 |

*Primary Examiner*—Steven M. Pollard
*Attorney, Agent, or Firm*—Albert M. Herzig

[57] ABSTRACT

This invention discloses a cover for an opening in a cargo container comprising a releasably secured flexible curtain. The invention also discloses a cargo container suitable for aircraft or seagoing vessels whose construction comprises edges of inner and outer corner molding strips which releasably retain side, top and bottom panels. The panels can be constructed of flexible, lightweight, durable and transparent materials.

17 Claims, 6 Drawing Sheets

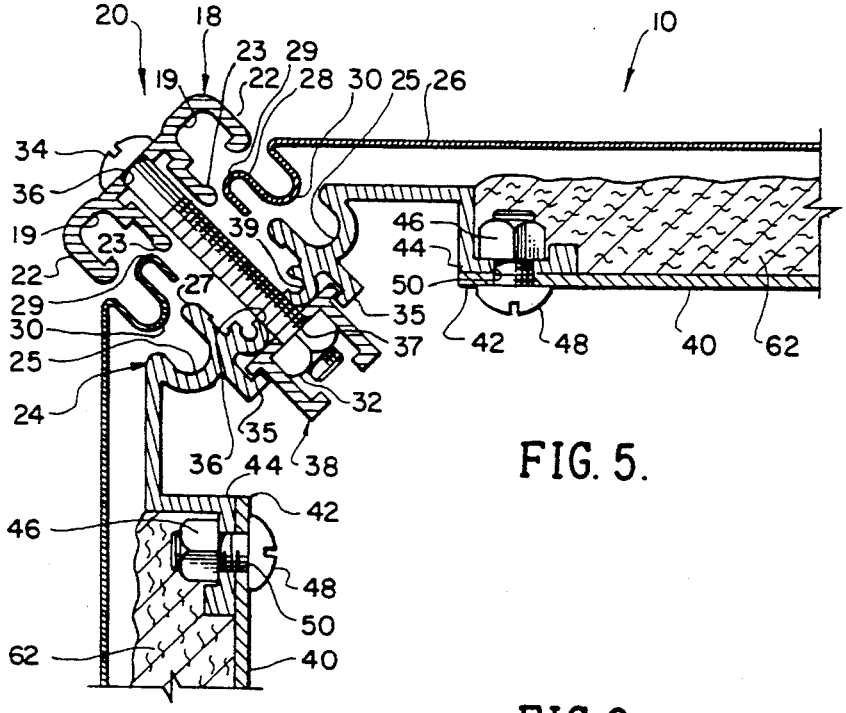
FIG. 5.
FIG. 6.
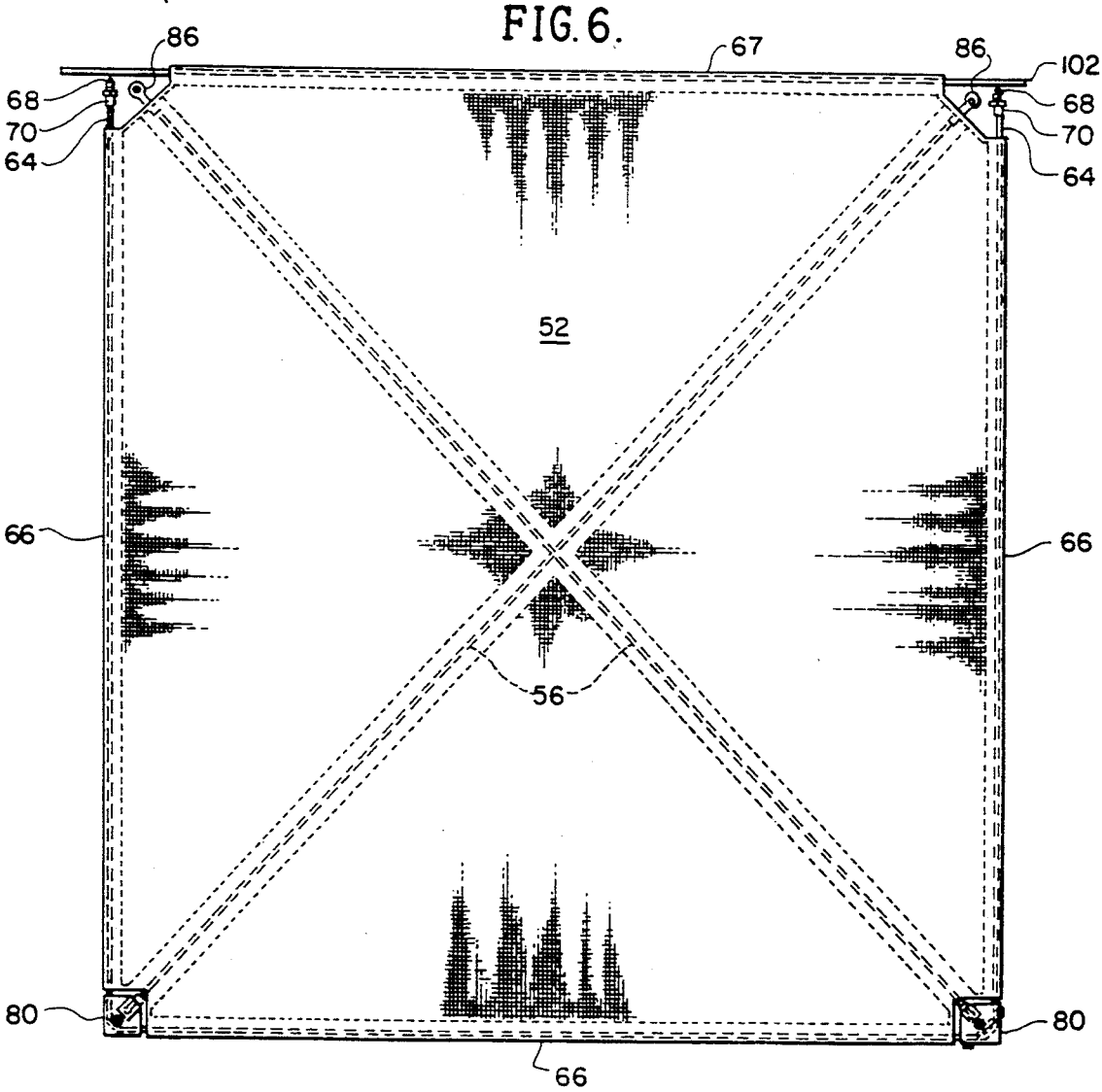

FIG. 7.
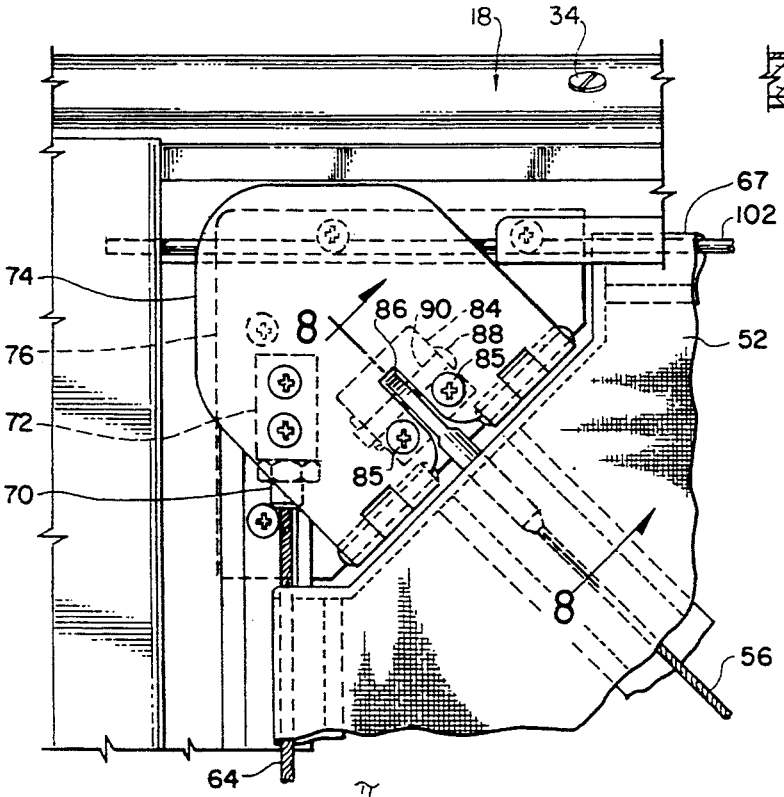
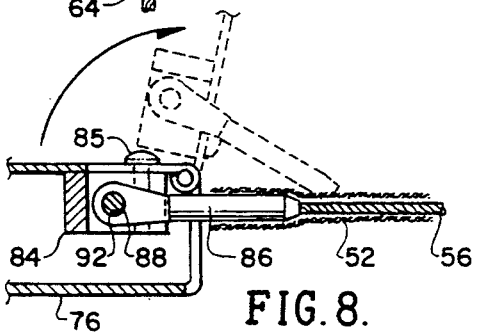
FIG. 8.
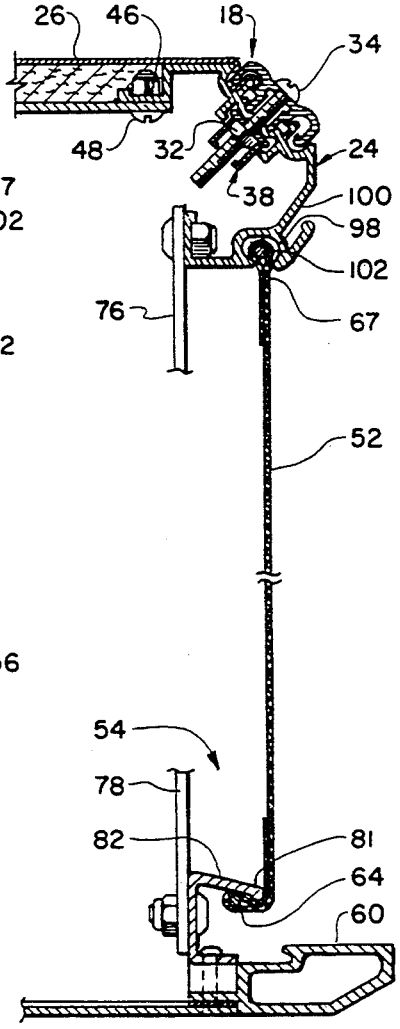
FIG. 10.
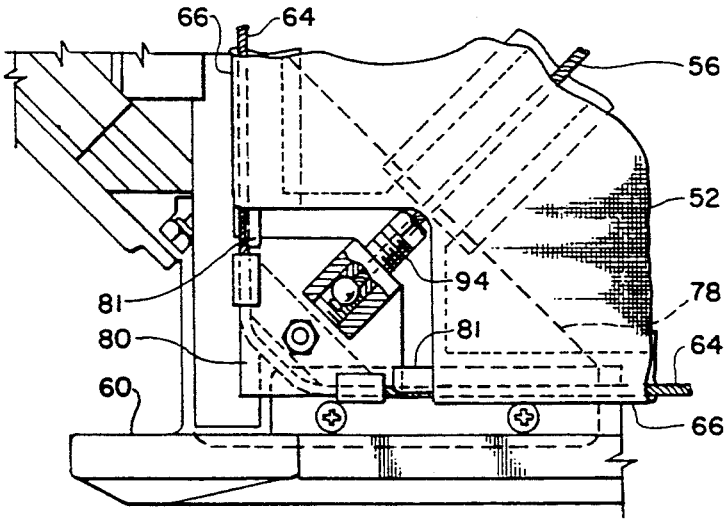
FIG. 9.

CONTAINER AND CONSTRUCTION THEREFOR

Matter enclosed in heavy brackets [ ] appears in the original patent but forms no part of this reissue specification; matter printed in italics indicates the additions made by reissue.

BACKGROUND OF INVENTION

1. Field of the Invention

This is a continuation-in-part of application Ser. No. 06/874,387, filed Jun. 16, 1986, *now abandoned*, which application was a continuation-in-part of application Ser. No. 06/813,898, filed Dec. 27, 1985, now abandoned, and relates to an improved container and construction therefor using an interlocking corner construction facilitating easy assembly and disassembly. The container is modular, easily repairable and structurally adaptable to hold various sized and shaped cargo items therein.

2. Description of the Prior Art

Prior art containers and container structures have provided containers that are of rigid and sturdy construction to safeguard cargo items being transported or stored therein. These prior art containers have a fixed exterior shape that is not capable of being modified to meet with various transport positions, that is, the curved interior hull of a cargo transport aircraft requires an asymmetrically shaped cargo container. Accordingly, many prior art air cargo containers are constructed in a number of fixed and rigid shapes, each of which has been pre-calculated to specifically occupy a known and shaped location in the cargohold of the transporting aircraft.

Logistic problems often arise in keeping an ample supply of properly shaped containers on hand to ensure proper loading for weight and balance of cargo aircraft. Additional problems often arise in the rigid construction of containers themselves. One of these problems is maintenance or attempted repair of a damaged container. For example, once a container wall is punctured or is structurally damaged, it must be quickly repaired to return the container to profit producing use. This is because a punctured container may allow pilferage or environmental damage to the container contents from water, humidity, sunlight, heat, cold, etc. A structural weakness could not only endanger a container's contents, but could also endanger the cargo transporting aircraft itself it such structural weakness were to occur at a critical moment in flight, i.e., during a violent thunderstorm.

The difficulty in repairing these rigidly constructed prior art containers is that their fixed construction is not readily adapted to alteration. To repair a damaged wall, major repair work must be initiated, usually requiring costly removal of the container from transporting goods. A puncture in a container's wall is usually patched, but a structurally weakened wall may require extensive, costly structural strengthening by experts, followed by recertification testing of the repaired container. All of these repair efforts are time-consuming and, thus, profit-losing as well as expensive in their own right.

The present invention provides a solution to these problems (as well as to other problems not here described) encountered in the prior art devices. Specifically, the present invention discloses and claims an improved container and construction therefor using an interlocking corner joint to construct the container, thereby providing a modular, easily repairable and structurally adaptable container. A container constructed in accordance with the present invention may have its exterior shape and dimensions modified quickly in the field using a handful of readily available hand tools to occupy a location demanding a specific shape. Thus, such a container would eliminate many of the logistical problems found in using existing prior art containers.

Similarly, a container constructed in accordance with the present invention is easily repairable in the field. Due to the unique and novel construction shown in the present invention, a punctured or structurally weakened member may be quickly removed and replaced in the field using only readily available hand tools and not requiring any special training on the part of the repair crew. The container may be quickly and profitably returned to service within an hour or so of commencing the repair work. Repair parts are standard, easily stored and cost effective to purchase.

The container constructed in accordance with the present invention will also have a greater strength and durability in the outer walls, resulting in lower cost of operation and maintenance. Under one of the preferred embodiments, the contents of the containers can be visibly checked.

SUMMARY OF THE INVENTION

An object of the present invention is to disclose a container using an interlocking corner joint in its construction that is modular, easily repairable in the field using a minimum of labor, tools or specialized training, and is structurally adaptable to occupy a number of known and shaped locations.

Another object of the invention is to disclose a container using an interlocking corner joint in its construction that is simple in construction, inexpensive to manufacture and operate, strong, durable and efficient in both operation and service.

A futher object of the invention is to disclose a container that can withstand impact and other loads to which cargo containers are subjected during loading, unloading and flight operations.

Yet a further object of the invention is to disclose a container whose contents can be visibly checked from the outside.

In an exemplary embodiment of the container constructed in accordance with the invention herein, the invention is directed to a container whose construction comprises an outer and an inner corner molding strip adapted to mate lengthwise to form a peripheral edge of a container. An outer skin forms a side of the container having its peripheral edges adapted to be inserted and releasably retained between the outer and inner corner moldings. At least one nut and bolt combination is inserted through an aligned hole in the outer and inner corner molding strips and is adapted to be threadably tightened to compress and retain the outer and inner corner molding strips and the outer side skin inserted therebetween in a releasable lengthwise relation. Thus is formed a peripheral edge of the container. An inner side skin forms an interior wall of the container by having its peripheral edges adapted to be releasably joined to the inner corner molding strip by means of at least one nut and bolt combination inserted through an aligned hole in the peripheral edge of the inner side skin and the inner corner molding strip. The nut and bolt combination is adapted to be threadably tightened to compress and retain the inner side skin and inner corner molding strip in a releasable lengthwise relation. Thus is formed an interior corner of the container. An opening into a side of the container and a flap made of flexible material releasably secured at its peripheral edges to the peripheral edges of the opening provide access into the interior of the container.

In another exemplary embodiment of the container constructed in accordance with the invention herein, the invention is directed to a container as previously described with an outer skin that has the qualities of being flexible, strong, durable and transparent.

These and other objects of the invention will become more readily apparent from the commentary hereinafter following taken in conjunction with the following description of the drawings.

BRIEF DESCRIPTION OF THE DRAWINGS

FIG. 5 is an enlarged cross-sectional view of a corner of a container as seen in FIG. 3 or FIG. 4.

FIG. 6 is a plan view of a door panel used in association with a container constructed in accordance with the invention claimed herein.

FIG. 7 is an enlarged view of the area encircled by line 7—7 of FIG. 2.

FIG. 8 is a view taken along the line 8—8 of FIG. 7.

FIG. 9 is an enlarged view of the area encircled by line 9—9 of FIG. 2.

FIG. 10 is a cross-sectional view taken along the line 10—10 of FIG. 2.

DESCRIPTION OF THE PREFERRED EMBODIMENT

Figure 1:
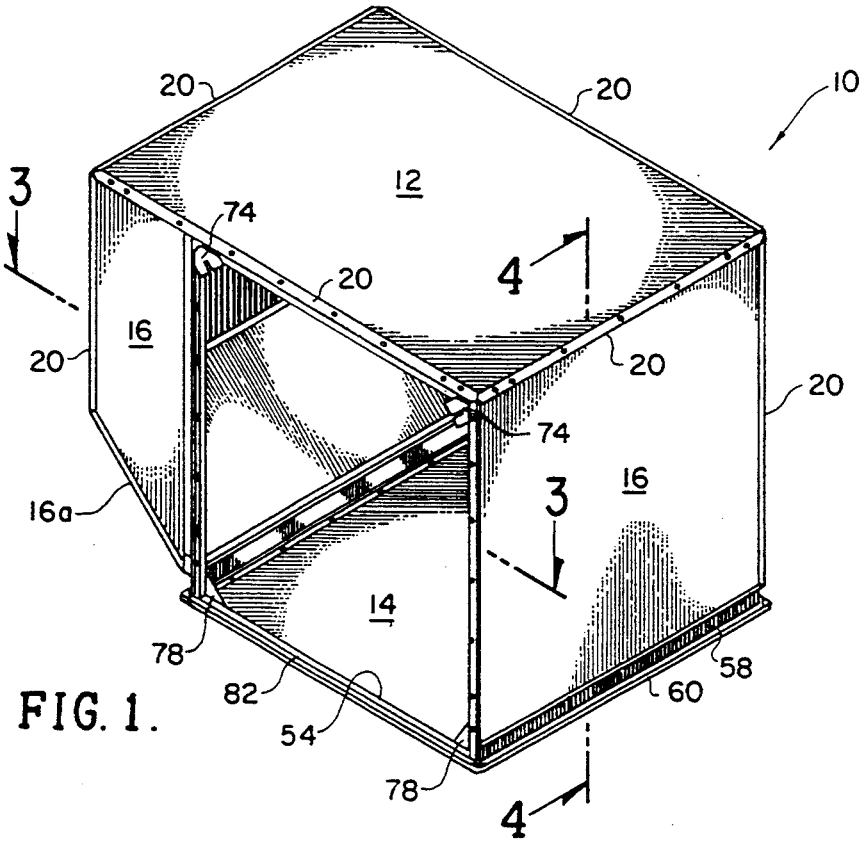
FIG. 1 is a perspective view of a container constructed in accordance with the invention herein claimed.
Figure 2:
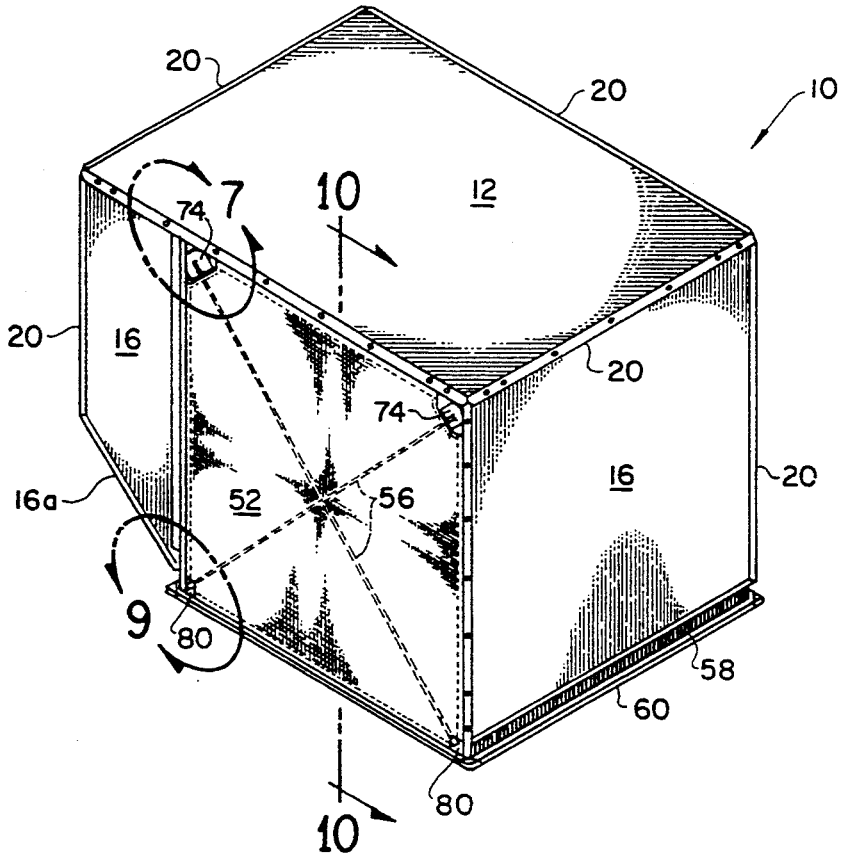
FIG. 2 is a perspective view similar to FIG. 1 showing a door panel attached to a container constructed in accordance with the invention claimed herein to provide for access into the interior of the container.
Figure 4:
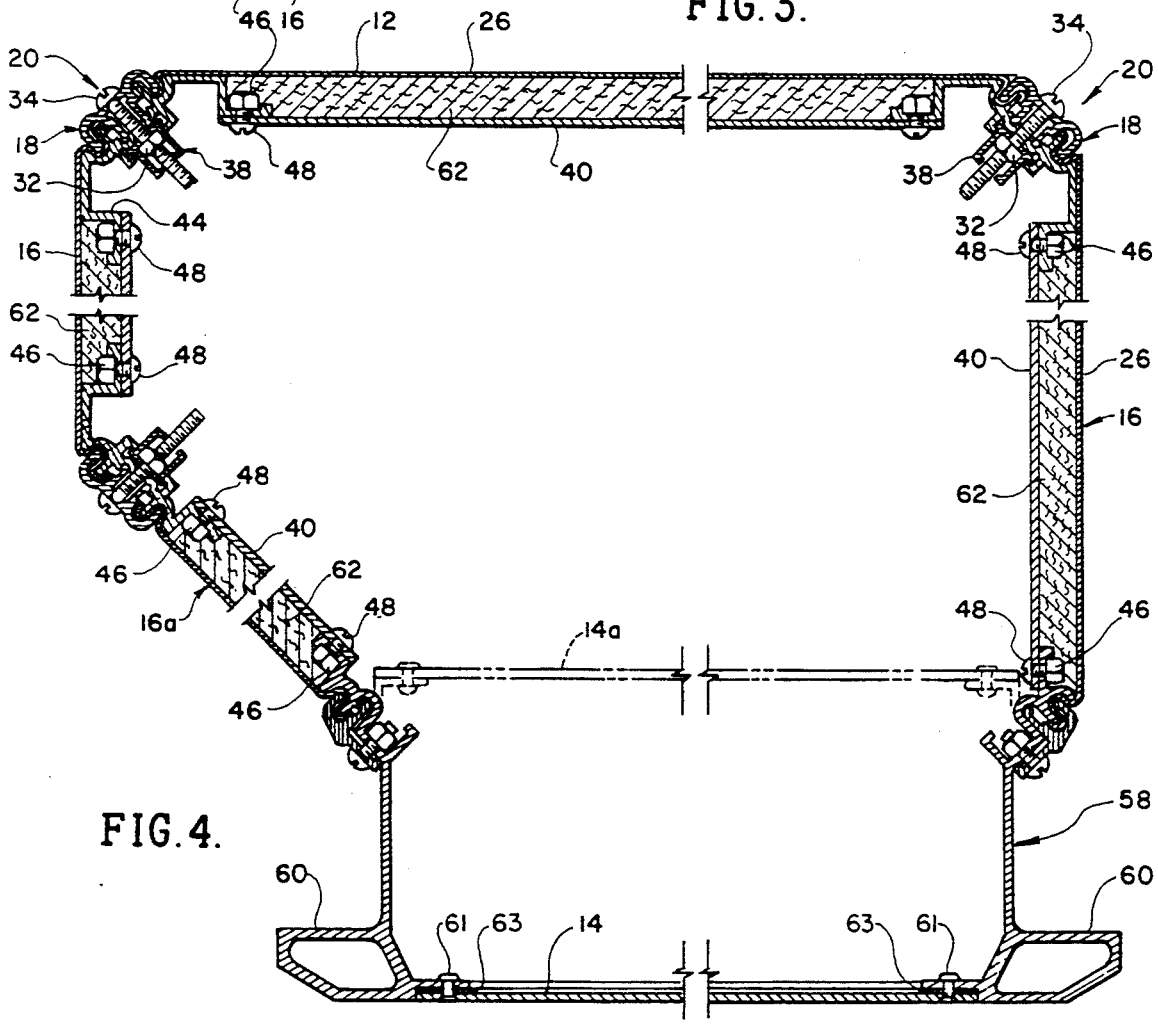
FIG. 4 is a cross-section view taken along the line 4–4 of FIG. 1.

Referring to the drawings, where like numbers of reference indicate like elements throughout, it will be noted that in a preferred embodiment of the invention for use as a cargo container, the container device of the invention, generally referred to as 10, comprises a top 12, a bottom 14, and a plurality of exterior side walls 16. As best seen in FIGS. 1, 2 and 4, the actual exterior shape of the container can be contoured to occupy a particular location, as for example, against the curved hull of a cargo aircraft or a seagoing vessel, by the addition of angled and/or shortened walls 16a.

Each top, bottom and side wall forming container 10 is constructed and jointed in a similar manner. Thus, for ease of understanding, only one of such typical constructions in joinings will be described in detail below.

In FIG. 5, peripheral corner 20 of container 10 is constructed with an outer corner channel strip 18 having flanged edges 22 adapted to mate lengthwise with an inner corner molding strip 24 and retaining side panel skins 24 thereinbetween to form the peripheral corner 20 of container 10.

As outer panel skin 26 forms a side of container 10. Peripheral edges 28 of outer panel skin 26 are adapted to be inserted and releasably retained between outer channel strip 18 an dinner molding strip 24.

The corrugated configuration of the peripheral edges 28 of the outer panel skin 26 are formed by rolling parallel ridges 29 and 30 around the four edges of each panel. The ridges are retained within corresponding longitudinal grooves 25 and 19, and the inner and outer molding strips 24 and 18, respectively. A projecting lip 27 of the inner molding strip 24 mates with ridge 29 and forces it into a groove 19 of the outer channel strip 18. Simultaneously, the flanged edges 22 of the outer channel strip 18 mate with the ridges 30 of the two side panel skins 26 and force them into opposite grooves 25 of the inner corner molding 24. Projecting lips 23 on the underside of the outer channel 18 mate with preferably semi-circular grooves 39 on the inner molding 24 and give the joint integral strength when the two moldings are clamped together. Thus, when threadably tightened, a bolt and nut combination 34 and 32 will compress and retain in a releasable lengthwise relation, the corrugated peripheral edges 28 of the outer panel skins 26 inserted between the inner and outer corner molding strips 24 and 18 to form the structural corner 20 of the container 10.

The bolt 34 is inserted through aligned holes 36 in the inner and outer corner molding strips 24 and 18 and hole 37 in a short channel piece 38. The nut 32 is held rotationally immobile in the channel 38 which is slidably inserted in the inner corner molding strip 24 and therein held in place by channel-like extensions 35 protruding from the inner side of molding strip 24. The nut holding channel 38 is therein retained by inwardly protruding lips.

Thus, as best shown in FIG. 5, in the replacement of damaged outer panel skins 26, the component parts comprising the structural corner 20 are not totally dismantled and the bolts and nuts 34 and 32 remain engaged in the channel molding strip 18 and inner molding strip 24, thus preventing their separation and loss.

The interior walls of container 10 are formed by an inner side skin 40 having its peripheral edges 42 adapted to be releasably jointed to a channel-like extension 44 of inner corner molding strip 24. Preferably, peripheral edges 42 are releasably joined to inner corner molding strip 24 by means of a nut 46 and bolt 48 combination. Bolt 48 is inserted through aligned holes 50 in peripheral edges 42 and in the channel-like extension 44 of inner corner molding strip 24. Nut 46 is held rotationally immobile in the channel portion 44, as best shown in FIG. 5, to threadably receive bolt 48 so that when the nut and bolt combination is threadably tightened, it will releasably join the peripheral edges 42 of inner side skin 40 an dinner corner molding strip 24 in a lengthwise relation, thus forming an interior wall of the container 10.

Figure 3:
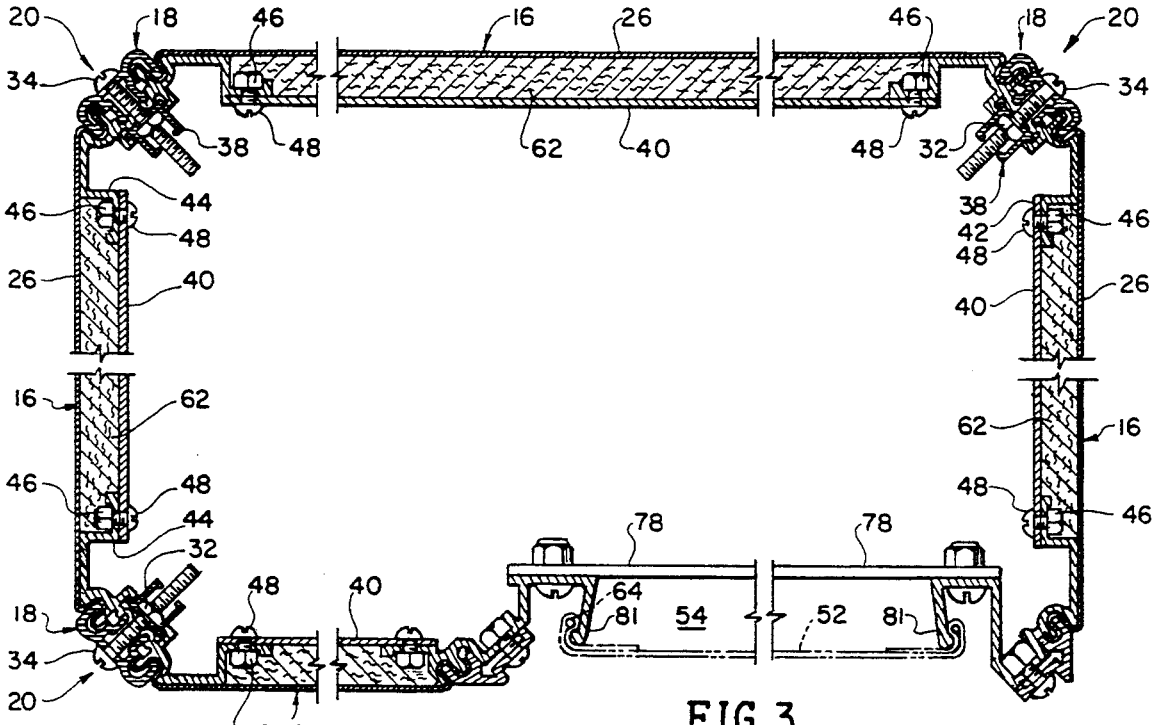
FIG. 3 is a longitudinal-sectional view taken along the line 3–3 of FIG. 1.

Also preferably, an insulating and strengthening material 62 of resilient compositions, best seen in FIGS. 3, 4 and 5, in inserted between inner and outer side skins 40 and 26. The plastic foam material or the like not only provides insulation for the container, but also acts to absorb deforming side forces which might otherwise structurally weaken or even puncture the sides of container 10.

Access with the interior of container 10 may be provided in a preferred embodiment through access opening 54 by means hereinbelow described and as best seen in FIGS. 2, 6, 7 and 10.

A flap 52 of flexible, environmentally protective material such as canvas, sheet plastic or the like, is releasably secured at its peripheral edges to the peripheral edges of access opening 54 in container 10, and is of sufficient size and shape to cover access opening 54.

Generally, it is preferred that flap 52 be strengthened by rigid cross-rods or cables 56 attached to flap 52, as is best shown in FIG. 6. These rods or cables may be fabricated of metal or plastic and should have some flexibility to insure a correct and tight fit of flap 52 to cover access opening 54. Flap 52 may be attached to cover access opening 54 in any number of conventional ways.

In the preferred embodiment of the flexible door flap 52, the means for attaching the flap 52 to the periphery of the opening 54 is shown in FIGS. 6, 7, 8, 9 and 10, and will be described in detail herein.

Referring now to FIG. 6, a flexible steel cable 64 is inserted through a hem sewn around the three border edges 66. The terminal ends 68 of cable 64 are fitted with threaded swivel sleeves 70 and retained by means of steel balls welded thereon. Sleeves 70 are screwed into retaining blocks 72 attached to the underside of the hinged release handles 74 (see FIG. 7). The hinged handle 74 has a triangular base 76 which is attached to the top inner corner of opening 54 in a manner similar to the gusset plates 78 attached to the lower corners (see FIGS. 1, 3 and 9).

As shown in FIGS. 6 and 9, a corner anchor block 80, releasably fitted into the protruding lips 81 of the modified inner corner molding 24 (see FIG. 3) and the threshold channel 82 (see FIG. 10) seats the periphery cable 64 and diagonal cables 56 in proper relative position for tensioning the cover flap 52 by flipping the hinged handles 74 into their locked position as shown in FIG. 8.

Referring to FIG. 7, the hinged handle 74 has a slotted cable anchor block 84 attached to its underside by means of screws 85. The clevis end 86 of the diagonal tension cable 56 is secured to the anchor block 84 by means of a pin 88 passing through holes 90 and 92 in the block 84 and clevis 86, respectively. When the door flap 52 is in place, the tension in cable 56 is adjusted by means of the threaded swivel sleeve 94 attached to the opposite ends of the cable (see FIG. 9).

The top hemmed edge 67 of the flap 52 is secured by inserting into a channel-like groove 98 in the modified extension 100 of the inner corner molding strip 24. A flexible plastic rod 102 is then slipped into hem 67 thereby holding the edge within the confines of the channel groove 98 (see FIG. 10).

To open the flap door 52 of the container 10, the two hinged handles 74 located on the upper corners of the access openings 54 are pulled forward, releasing the tension on the periphery cable 64 and the diagonal cables 56, thus permitting the edges 66 and the corner anchor blocks 80 to be disengaged from the lips 81 encompassing the opening 54.

To completely remove the flap 52 from the container 10, the pins 88 are removed from the clevis 86, thus releasing the ends of the diagonal cables 56, and the two threaded sleeves 70 are unscrewed from the anchor blocks 72 to release the ends 68 of the periphery cable 64. Finally, the plastic rod 102 is pulled out to release the top edge 67 from its confinement in the channel groove 98.

The removal of the rod 102 within the restricted inner space of the container requires it to be bent during this operation. Thus, its resilient flexibility is a primary characteristic.

Figure 11:
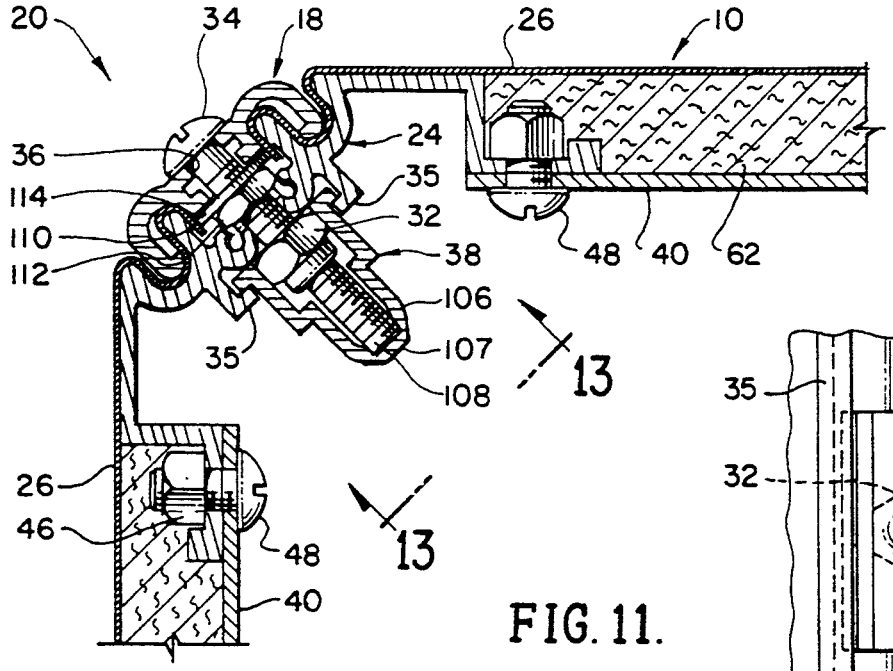
FIG. 11 is an enlarged cross-sectional view of a second preferred embodiment of the corner construction of a container similar to FIG. 5 showing the modification thereon.
Figure 12:
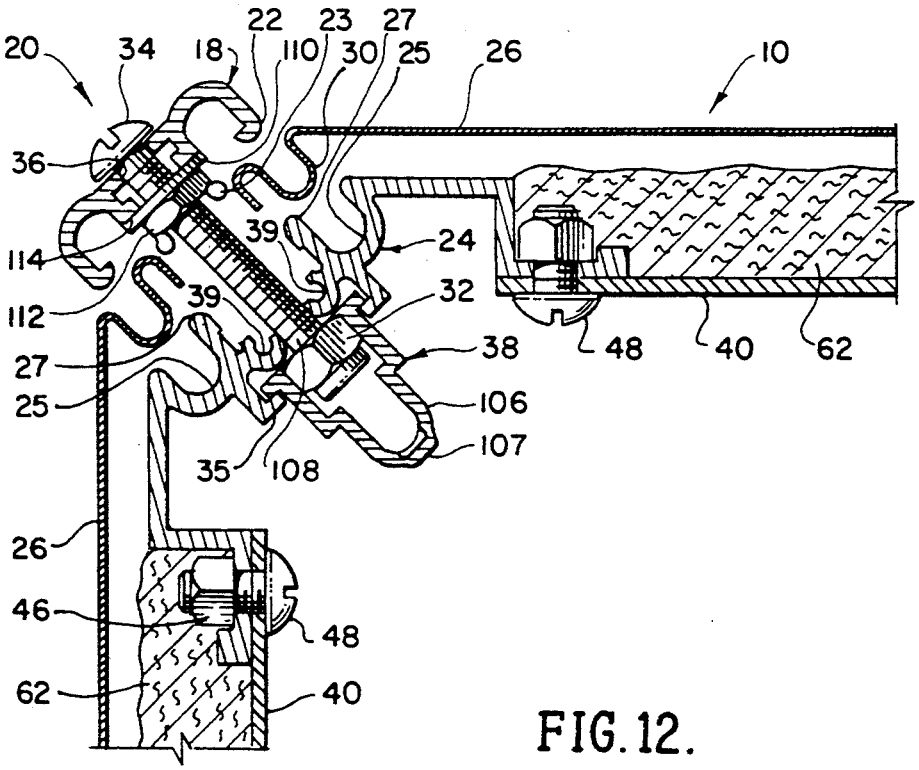
FIG. 12 is an enlarged cross-sectional view of the corner construction of a container similar to FIG. 11 showing the component parts in a disengaged position allowing the removal of the wall panels.

A second preferred embodiment of the corner construction 20 of container 10 is shown in FIGS. 11 and 12. This construction is similar to that shown in FIG. 5, with the exception of the modifications which will be hereinafter described in detail.

Figure 13:
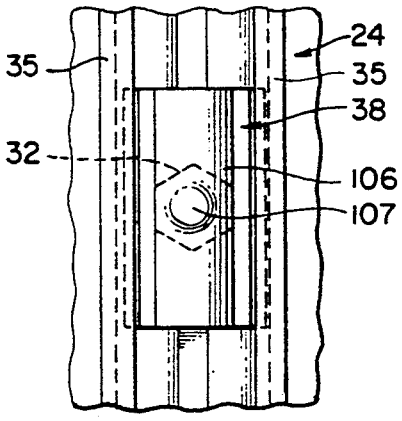
FIG. 13 is a fragmentary elevational view taken along the line 13—13 of FIG. 11.

The configuration of channel 38 as shown in FIG. 5 is modified by the addition of an integrally formed U-shaped extrusion 106, as shown in FIGS. 11, 12 and 13. In this embodiment, the projecting end 108 of the bolt 34, when tightened in nut 32, is protectively encapsulated by channel 38 with its U-shaped extrusion 106, thus preventing damage to the extended end of bolt 34 or the thread thereon and also the cargo stored within the container. When the bolt 34 is tightened during the assembly of the peripheral corner 20 of the container 10, its length is such as to cause a dimple 107 in the U-shaped portion 106 of the channel 38. Thus, the mating of the bolt end 38 and dimple 107 prevents the channel 38 from sliding from its position encompassing the nut 32, especially on the vertical corners. When the bolt 34 is rotatably retracted to the position shown in FIG. 12, its end 108 remains threadably engaged with the nut 32. This retracted position permits the disengagement of the outer skin 26 which was retained between the outer molding strip 18 and the inner molding strip 24. Thus, the component parts comprising the peripheral corner 20 are not totally dismantled during the attachment and/or replacement of the outer skin panel 26.

In this second preferred embodiment, it should be noted that a washer 110 and supporting nut 112 are threadably mounted on bolt 34 in a counterbored recess 114 in the underside of the molding strip 18. The self-locking nut 112, commercially known as a "nyloc-nut", has a nylon insert which clinches the nut onto the threads of the bolt 34 in a relative position allowing a clearance space between the washer 110 and molding strip 18, thus permitting the bolt to rotate in the hole 36 and in the outer molding strip 18. Thus, when the bolt 34 is rotatably retracted to its outer position as shown in FIG. 12, the washer 110 and nut 112 rotate with the bolt and remain in their relative position affixed upon the bolt 34. The nut 32 being held rotationally immobile in the channel 38 unscrews from the bolt 34, thus forcing the outer molding strip 18 to disengage from its locking position with inner molding 24 and, thereby, releasing outer skin 26.

The standardized and modular construction of the container 10 built in accordance with the invention disclosed and claimed herein, may also, in a preferred embodiment best shown in FIG. 4, have installed a secondary bottom 14a (shown in phantom). In conjunction with this preferred construction, two openings (not shown) are cut into a lower panel portion 58 of the side wall 16 to enable the forks of the forklift truck to engage and disengage from the container without damaging the contents stored therein.

The lower panel portions 58 are reinforced with peripheral hollow stiffener members 60 forming a structural frame around the bottom 14 which is attached to the members 60 by means of rivets 61 with a water-tight gasket 63 in between.

A tension adjustment means such as a turnbuckle may be added to the cables to permit manual adjustment of the tension and resulting tautness applied to the cables. This will increase the useful life of the container and door combination as it will permit allowances to be made for the normal stretch encountered in cables constantly undergoing tension and release operations.

Figure 14:
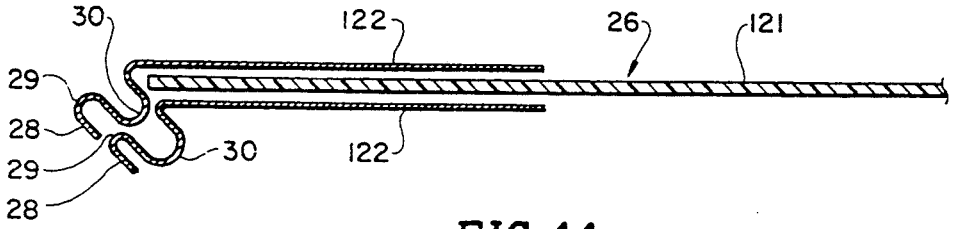
FIG. 14 is an enlarged cross-section view of a second preferred embodiment of the outer skin construction of a container similar to FIG. 5 showing the modifications thereon.

A second preferred embodiment of the outer panel skin designated generally as 26 is shown in FIG. 14. Instead of constructing the outer panel skin 26 from a single piece of material, a main skin panel 121 of Lexan ® or similar material is bonded between two identical outer panel skin edge pieces 122 constructed of aluminum, plastic or glass with mating profiles. The outer panel edge pieces 122 are rolled prior to bonding to form the corrugated peripheral edges 28 of the outer panel skins 26 and, as in the previous embodiment, are formed by rolling parallel ridges 29 and 30 and bonding the main skin panel 121 between the edge pieces 122 so that the corrugated configuration of the peripheral edges 28 extend around the four edges of each outer panel skin 26. Bonding between the main skin panel 121 and the edge pieces 122 is accomplished by using cold-cured epoxy or urethane.

Figure 15:
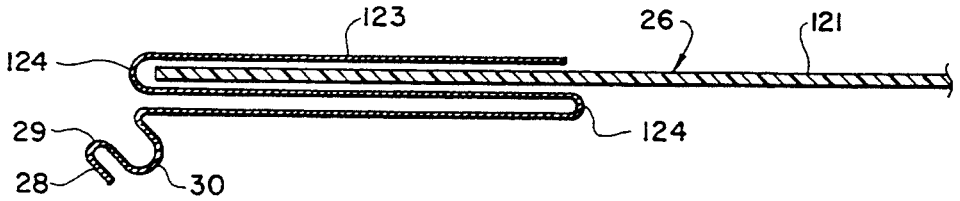
FIG. 15 is an enlarged cross-section view of a third preferred embodiment of the outer skin construction of a container similar to FIGS. 5 and 14 showing the modifications thereon.

A third preferred embodiment of the outer panel skin, again designated generally as 26, is shown in FIG. 15. Here, as in the previous embodiment, a main skin panel 121 of Lexan ® or similar material is bonded to an outer panel skin edge piece 123 of aluminum, plastic or glass, which forms the peripheral edges 28 of the outer panel skin 26. In this embodiment, the edge piece 123 is formed from a single piece of material and is rolled to form the corrugated peripheral edges 28 by rolling parallel edges 29 and 23. The opposite unrolled side of the edge piece 123 is then folded back on itself twice with folds 124, as shown in FIG. 15. The main skin panel 121 is inserted in one of the folds 124 and bonded to the edge piece. The edge piece 123 forms the corrugated peripheral edges 28 of the outer panel skin 26 and, as in the previous embodiments, the corrugated configuration of the peripheral edges 28 extend around the four edges of each outer panel skin 26. Again as in the previous embodiment, bonding is accomplished using cold-cured epoxy or urethane.

The second and third embodiments of the outer panel skin provide an outer panel skin of reduced weight and increased durability. The main skin panels of Lexan ® or similar material are able to withstand high impact loads and are more flexible than skins of metal, with a significant reduction in weight which is of utmost importance to customers and users such as airline companies. Also, the use of Lexan ® or similar material provides a container whose contents can be visibly checked from the exterior.

Figure 16:
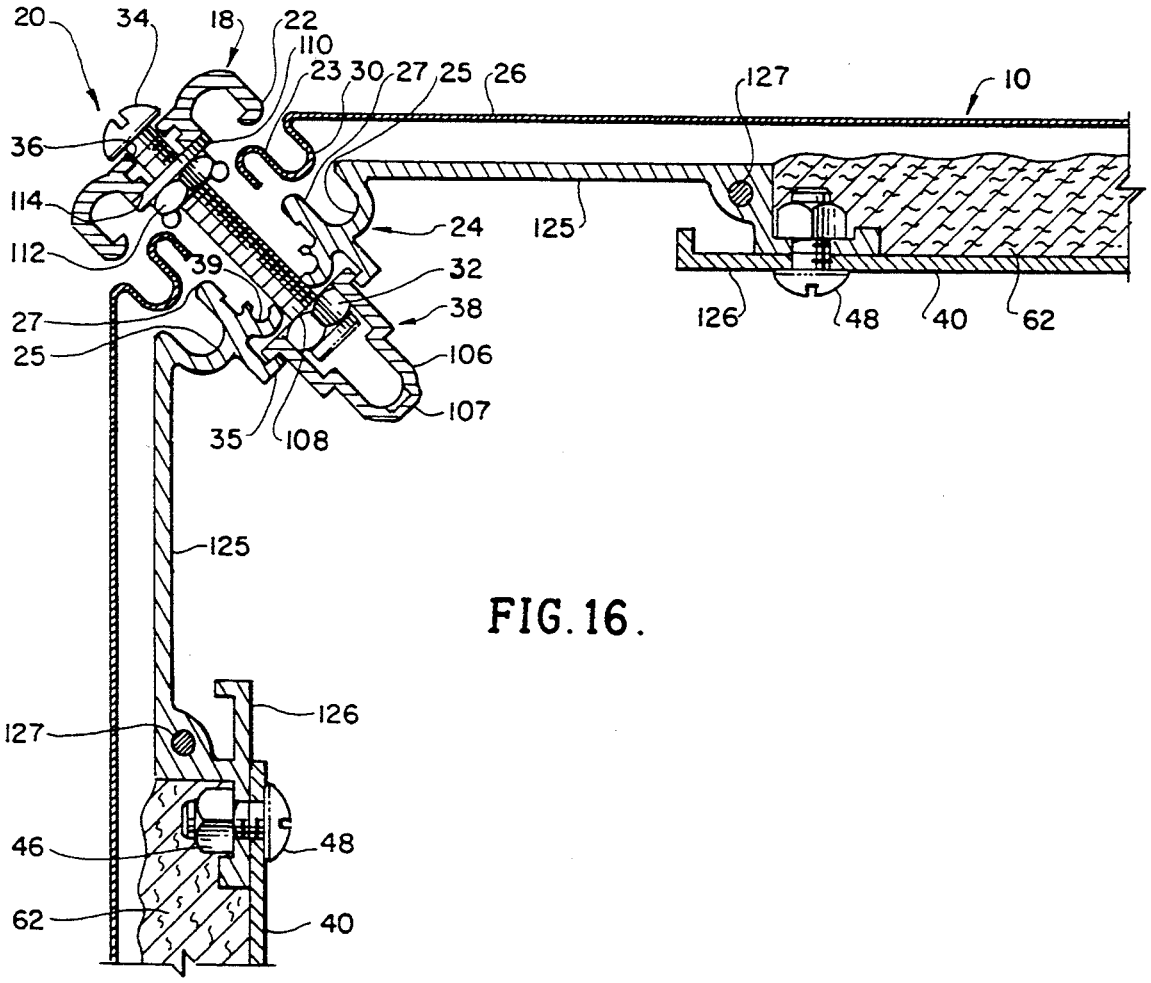
FIG. 16 is an enlarged cross-sectional view of a third preferred embodiment of the corner construction of a container similar to FIGS. 5 and 11 showing the modifications thereon.

A second preferred embodiment of the peripheral corner 20 of container 10 is shown in FIG. 16. As previously indicated, the peripheral corner 20 is constructed with an outer corner channel strip 18 and an inner corner molding strip 24. In this second preferred embodiment, the leg 125 of the inner corner molding strip 24 is extended and has an increased cross-sectional area 126 at the end of the leg. This increased cross-sectional area 126 at the end of the leg provides a greater moment of inertia, causing the peripheral corner 20 to resist bending and subsequent deformation from loads applied exteriorly to the container 10 and in the area of the peripheral corner 20. Also, to increase the ability of the container and its peripheral corners to withstand exteriorly applied loads and resist deformation, a flexible steel cable 127 is bonded to the interior of the leg at an optimal location.

The invention described above in susceptible to many variations, modifications and changes, all of which are within the skill of the art. It should be understood that all such variations, modifications and changes are within the spirit and scope of the invention and the appended claims. Similarly, it will be understood that it is intended to cover all changes, modifications and variations of the example of the invention herein disclosed for the purpose of illustration which do not constitute departures from the spirit and scope of the invention.

I claim:

1. A construction for a cargo container having a top, a bottom and a plurality of side walls defining an enclosed interior comprising:

(a) means defining a peripheral corners of the cargo container, the means comprising:
  (i) an outer corner channel strip defining a longitudinally extending groove means opening inwardly toward the container interior and including a longitudinally extending edge; and,
  (ii) an inner molding strip defining a longitudinally extending groove means opening outwardly away from the container interior and including a longitudinally extending projecting lip;

(b) a wall of the container comprising a continuous, unperforated semi-rigid panel with peripheral edges having parallel ridges formed thereon; and, (c) attaching means to removably attach the outer corner channel strip to the inner molding strip such that a ridge of the semi-rigid panel and the projecting lip of the inner molding strip extend into the inwardly opening groove means defined by the outer corner channel strip, and a ridge of the semi-rigid panel and the edge of the outer corner channel strip extend into the outwardly opening groove means defined by the inner molding strip so as to clamp the peripheral edge of the semi-rigid panel between the outer corner channel strip and the inner molding strip, the attaching means comprising:
  (i) nut retaining means on the inner molding strip;
  (ii) nut means non-rotatably retained in the nut retaining means; and, (iii) threaded means extending through the outer corner channel strip and the inner molding strip, and threadingly engaging the nut means.

2. The cargo container construction according to claim 1 wherein the semi-rigid panel is formed from a plastic material.

3. The cargo container construction according to claim 2 wherein the plastic material in transparent.

4. The cargo container construction according to claim 2 wherein the plastic material is translucent.

5. The cargo container construction according to claim 2 wherein the semi-rigid panel is formed from a polycarbonate plastic material.

6. The cargo container construction according to claim 2 further comprising edge pieces attached to the semi-rigid panel, the edge pieces defining the parallel ridges.

7. The cargo container construction according to claim 6 wherein the edge pieces are adhesively bonded to the semi-rigid panel.

8. The cargo container construction according to claim 7 further comprising a first edge piece bonded to a first side of the semi-rigid panel and a second edge piece bonded to a second side of the semi-rigid panel.

9. The cargo container construction according to claim 7 wherein the edge pieces define a folded portion, the folded portion being adhesively bonded to both sides of the semi-rigid panel.

10. A cargo container construction according to claim 1 further comprising:

(a) an enlarged portion on the threaded means and disposed on one side of the outer corner channel strip; and, (b) a second nut means threadingly engaged with the threaded means and disposed on an opposite side of the outer corner channel strip such that rotation of the threaded means in one direction urges the outer corner channel strip away from the inner molding strip.

11. The cargo container construction according to claim 1 wherein the nut retaining means comprises a generally "U" shaped channel member attached to the inner molding strip and having the nut means disposed therein, the width of the "U" shaped channel being approximately equal to the distance between flat sides of the nut means to prevent rotation of the nut means relative to the "U" shaped channel member.

12. The cargo container construction according to claim 11 wherein the generally "U" shaped member engages an end of the threaded means extending into the interior of the container when the outer corner channel strip is in clamping relationship with the inner molding strip.

*13. In combination with a cargo container having a top, a bottom and a plurality of side walls defining an enclosed interior, the improvement comprising:*

*(a) means defining peripheral corners of the cargo container, the means comprising:*

*(i) an elongated corner channel strip defining a longitudinally extending edge projecting therealong, and*

*(ii) an elongated molding strip defining a longitudinally extending groove therealong;*

*(b) at least one of the walls of said container comprising an unperforated sheet of semi-rigid transparent polycarbonate plastic material, corrugated around its periphery to form a panel having a marginal edge which includes a ridge and a groove, the longitudinally extending edge of said channel strip being releasably inserted into and seated within the groove in the marginal edge of said panel while the corresponding ridge of said panel is releasably inserted into and seated within the groove of said molding strip; and*

*(c) means for maintaining the longitudinally extending edge of said channel strip within the edge groove of said panel and for maintaining the corresponding ridge of said panel within the groove of said molding strip comprising the compressive clamping of the edge groove and ridge of said panel between the extending edge of said channel strip and groove of said molding strip to form a peripheral corner of the cargo container.*

*14. In a cargo container having a top, a bottom and a plurality of side walls with interlocking corner joints at the peripheral corners thereof and defining an enclosed interior, the improvement comprising:*

*(a) elongated corner molding strips at said corner joints defining longitudinally extending groove means, said strips defining the peripheral corners of said container;*

*(b) unperforated semi-rigid transparent panels of sheet polycarbonate plastic material forming the walls of said container, said wall panels having the peripheral edge portions with an extending ridge and an extending groove formed thereon, and said panels in each of said edge portions being adapted at its extending ridge to be inserted into and seated within a groove means of a corner molding strip;*

*(c) corner channel strips each including a longitudinally extending edge adapted to be inserted into the extending groove of the edge portion of a wall panel with the ridge of said edge portion of said wall panel inserted into and seated within a groove means of a corner molding strip; and*

*(d) means for maintaining the longitudinally extending edge of a corner channel strip within the extending groove of the edge portion of each wall panel and for maintaining the extending ridge of the edge portion of each wall panel within a groove means of a corner molding strip comprising the compressive clamping of the edge groove and ridge of said panel between the extending edge of said channel strip and groove of said molding strip whereby the edge portions of each wall panel are releasably retained between a corner channel strip and a corner molding strip thereby forming an interlocking joint at the peripheral corners of said container.*

*15. The improvement in a cargo container as claimed in claim 14 wherein the sheet plastic material of said wall panels is translucent.*

*16. In a cargo container having a top, a bottom and a plurality of side walls defining an enclosed interior and having interlocking joints at the peripheral corners thereof for ease in the assembly and disassembly of said container, the improvement comprising:*

*(a) elongated corner molding strips at said corner joints defining longitudinally extending groove means, said strips defining the peripheral corners of said container;*

*(b) unperforated semi-rigid transparent panels of polycarbonate sheet plastic material forming the walls of said container, said wall panels having corrugated peripheral edge portions presenting an extending ridge and an extending groove, and said panels in each of said corrugated edge portions being adapted at its extending ridge to be releasably inserted into and seated within the groove means of a corner molding strip;*

(c) *corner channel strips each including a longitudinally extending edge adopted to be releasably inserted into the extending groove of the corrugated edge portion of a wall panel with the ridge of said edge portion of said wall panel inserted into and seated within the groove means of a corner molding strip; and*

(d) *means for maintaining the longitudinally extending edge of a corner channel strip within the extending groove of the corrugated edge portion of each wall panel and for maintaining the extending ridge of the edge portion of each wall panel within a groove means of a corner molding strip comprising the compressive clamping of the edge groove and ridge of said panel between the extending ridge of said channel strip and the groove of said molding strip, whereby the corrugated edge portions of each wall panel are releasably retained between a corner channel strip and a corner molding strip thereby forming an interlocking joint at the peripheral corners of said container.*

*17. The improvement in a cargo container as claimed in claim 16 wherein the polycarbonate sheet plastic material forming the walls of said container is translucent.*

* * * * *